United States Patent [19]

McNeill

[11] 4,301,952
[45] Nov. 24, 1981

[54] ARTICLE CARRYING BAG FOR BICYCLES AND THE LIKE

[75] Inventor: Robert M. McNeill, Sunnyvale, Calif.

[73] Assignee: McNeill-Favia Company, Mountain View, Calif.

[21] Appl. No.: 148,693

[22] Filed: May 12, 1980

[51] Int. Cl.³ .............................................. B62J 9/00
[52] U.S. Cl. ..................................... 224/32 A; 224/31
[58] Field of Search ................... 224/32 A, 30 A, 31, 224/36, 39

[56] References Cited

U.S. PATENT DOCUMENTS

| 1,154,179 | 9/1915 | Musselman ........................ 224/32 A |
| 3,795,354 | 3/1974 | Stippich ........................... 224/32 A |
| 3,938,716 | 2/1976 | Jackson et al. ..................... 224/31 X |
| 3,970,229 | 7/1976 | Norinsky ....................... 224/32 A X |

Primary Examiner—Steven M. Pollard
Attorney, Agent, or Firm—Thomas H. Olson

[57] ABSTRACT

An article carrying bag and a structure affording removable mounting of the bag to a bicycle or like vehicle. The bag is formed of two separate compartments which are joined at their upper edges by a relatively narrow web so that when the bag is carried it resembles a briefcase. The mounting structure includes a rigid, relatively small diameter tube; the web of the carrying bag includes a resilient member forming a channel having walls which frictionally engage the tube. The support structure for the tube includes a guard member which supports the tube and keeps the inner surfaces of the compartments of the carrying bag outward of the vehicle wheel.

9 Claims, 3 Drawing Figures

ARTICLE CARRYING BAG FOR BICYCLES AND THE LIKE

BACKGROUND OF THE INVENTION

1. Field of the Invention

This invention relates to an article carrying bag and means for removably attaching the bag to a bicycle and more particularly to such bag that is particularly suited for carrying books and similar articles used by students and the like.

2. Description of the Prior Art

There are numerous article carriers for bicycles made in the form of wire baskets mounted either on the front handle bars or on opposite sides of the rear wheel. Although useful, such devices add significant weight to the bicycle and are frequently large and bulky.

Another form of bicycle carrier is exemplified by U.S. Pat. No. 4,174,795 and involves a cumbersome and complicated structure for mounting a canvas or fabric suitcase-like bag to the rear of a bicycle.

SUMMARY OF THE INVENTION

The bag or carrier of the present invention is typically formed of high strength fabric such as nylon or the like. The carrier is formed with two separate compartments which are joined at their upper extremities to a relatively narrow horizontally extending web. To the web is secured a handle so that the bag can be carried in the manner of a briefcase. A rigid elongate tube of small diameter and light weight is mounted above the rear bicycle wheel, and the carrier can be placed on the elongate member with the two compartments in flanking relation to the elongate member and the rear wheel. On the underside of the web is a clamping member which secures the carrier to the elongate member but affords rapid and simple detachment of the bag should the user desire to carry the bag and its contents to a location remote from the bicycle.

An object of the present invention is to provide a bicycle article carrier that is light in weight. This object is achieved by forming the carrier bag from light weight, high strength fabric and by constructing the bicycle mounted support in the form of a thin light weight rigid tube.

Another object of the invention is to provide a bicycle carrier bag which can be firmly secured to the bicycle to avoid dislodgement while the bicycle is in motion but which can be quickly and conveniently unfastened from the bicycle. This object is achieved by providing a resilient U-shaped member permanently connected to the underside of the carrier web; the U-shaped member has resilient or elastic walls from each of which an upper and lower rib projects inward from the walls. The ribs engage the tubular member and the resilience of the material permits rapid and simple disengagement.

A further object of the invention is to provide a two compartment bicycle carrier bag which remains firmly fastened to the bicycle notwithstanding unequal loading in the respective compartments. This object is achieved by providing a U-shaped substantially rigid stiffener which is rigid with the central web and is embraced by layers of the two compartments. Accordingly, should one compartment be fully loaded and the other empty, the flexible fabric of which the bags are formed is retained in relatively stiff nondeformed condition notwithstanding such unbalanced loading.

A feature and advantage of the above noted stiffener is that it cooperates in retaining the inner surfaces of the compartments outward of the wheel and the spokes of the wheel.

Yet another object of the invention is to provide a carrier bag which is attractive and is virtually indistinguishable in appearance from a briefcase. This object is achieved because the tubular mounting rod is of small diameter so that the web separating the two compartments can be correspondingly narrow. These dimensions together with the flexibility of the fabric of which the carrier bag is constructed cooperate to produce the desired attractiveness.

The foregoing together with other objects, features and advantages will be more apparent after referring to the following specification and the accompanying drawings.

DESCRIPTION OF THE PREFERRED EMBODIMENT

Figure 2:
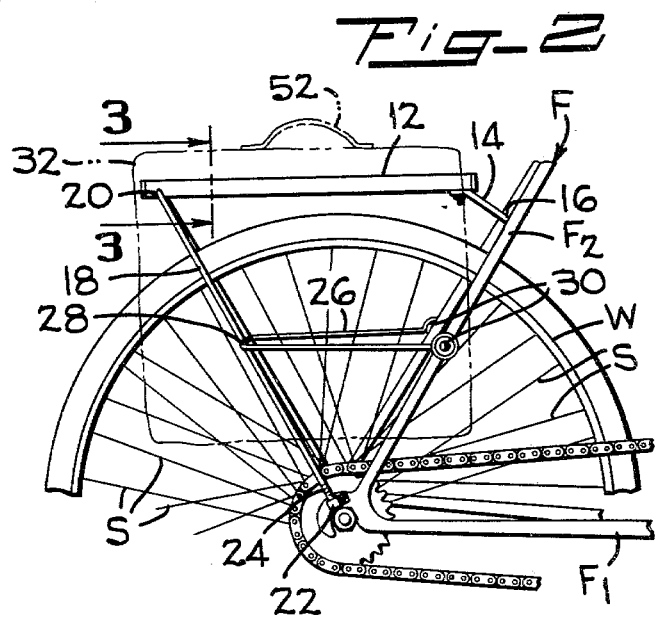
FIG. 2 is a side perspective view of the rear portion of a bicycle showing the rigid elongate mounting member and the braces for fixing it to the bicycle frame.

Referring more particularly to the drawings, reference character F indicates a bicycle frame which supports a hub H from which spokes S radiate to a wheel rim W. In normal operation of the bicycle, wheel W will reside in a substantially vertically oriented plane. Referring to FIG. 2, frame F includes a horizontally extending frame portion $F_1$ and an obliquely extending frame portion $F_2$ which intersect to form a mount for the rear axle on which hub H is supported. In accordance with the invention there is an elongate rigid member 12 which in the embodiment shown in the drawing is of hollow tubular configuration with a cylindrical external surface and an outer diameter of approximately $\frac{3}{4}$ inches. For mounting the elongate member 12 to frame F, there is a forward mounting bracket 14 which is fixed to frame portion $F_2$ at 16. The rear extremity of elongate member 12 is supported by a substantially inverted U-shaped rigid support 18 which, in one embodiment of the invention, is formed of metal rod of approximately $\frac{1}{4}$ inch diameter. Elongate member 12 is apertured at 20 to admit support 18 therethrough in a pivotal manner so that member 12 can be mounted on frames of differing dimensions. The lower end of each side of support 18 is fixed to the frame by means of a clamp 22. Clamp 22 is such that support 18 can be mounted to assure that elongate member 12 is substantially horizontal. In this connection, the lower portion of support 18 can be threaded as at 24 so that mounting bracket 22 can be moved along the support before it is fixed to the frame.

The mounting structure also includes a guard member 26 which extends from a point 28 on support 18 which is approximately midway between the opposite ends of support 18. The forward end of guard member 26 is secured to frame portion $F_2$ by fasteners 30 which can be mounted to the frame portion at a suitable height to orient guard member 26 in an approximately level position parallel to elongate member 12. As will appear, the distance between elongate member 12 and guard member 26 is less than the vertical extent of the carrier bag of the invention so that the inner surfaces of the two compartments of the carrier bag rest against guard 26 and are thereby retained outward of wheel W and spokes S.

Figure 1:
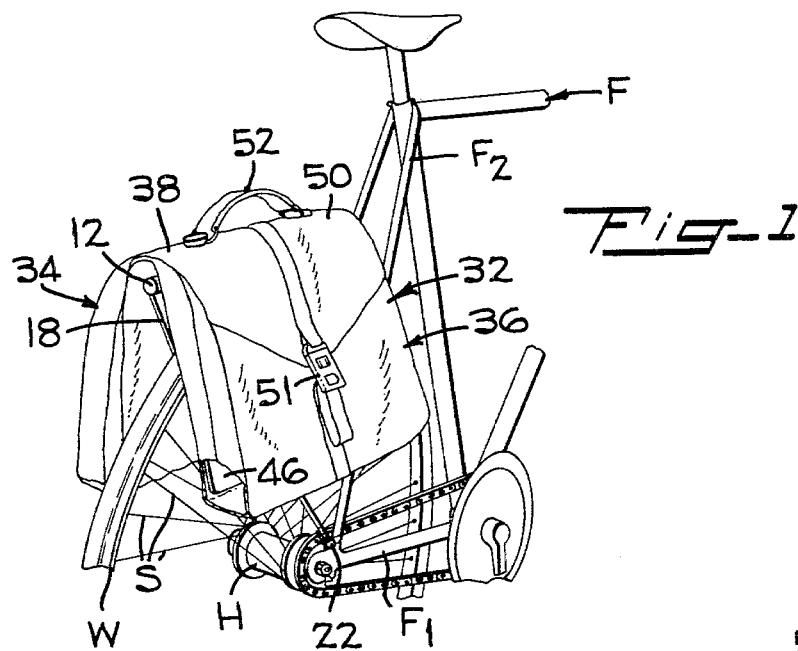
FIG. 1 is a perspective view of the rear portion of a bicycle showing a carrier bag according to the invention in place on the bicycle.
Figure 3:
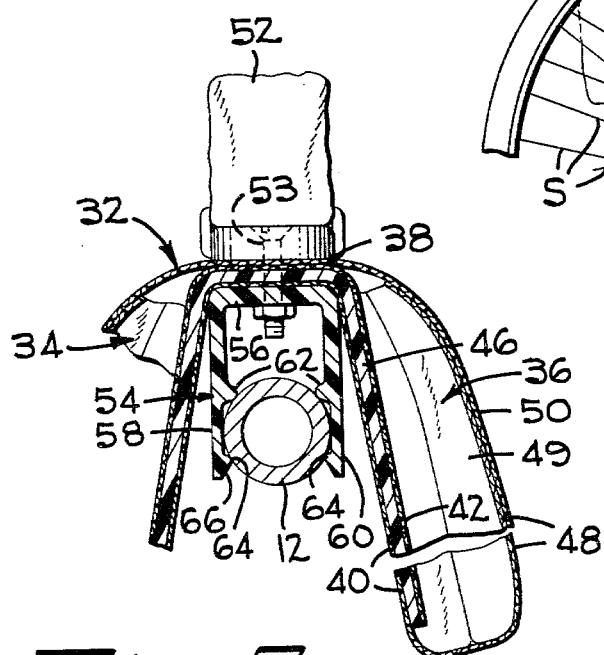
FIG. 3 is a cross-sectional view taken along line 3—3 at enlarged scale.

Reference numeral 32 identifies the carrier bag that constitutes a part of the invention. The carrier bag, as seen in FIG. 1, is composed of two compartments, identified at 34 and 36 which are substantially identical to one another and are symmetrical of a central web portion 38. Because each compartment is the same, a description of one will suffice for a description of both. As seen in FIG. 3, compartment 36 is composed of an inner ply 40 of suitable fabric such as woven nylon or the like. There is an intermediate ply 42 which is fastened to inner ply 40 by stitching along the vertical edges of the plies. Between the two plies is a semi-rigid stiffener 46 which, as seen in FIG. 3, is of U-shaped configuration having a right-hand panel that stiffens compartment 36, a left-hand panel that stiffens compartment 34, and a horizontal portion that is coextensive with web 38. In one device designed in accordance with the present invention, stiffener is formed of a sheet of ABS or like semi-rigid plastic material wherein the intersections at the opposite lateral extremities of web 38 are formed by heating portions of the material, bending the material into the U-shaped configuration seen in FIG. 3 and then permitting the material to cool.

Compartment 36 includes an outer ply 48 which is integral with ply 40 and is folded with respect thereto to define the bottom of compartment 36. A gusset 49 joins the side edges of plies 40 and 48, the gusset being pleated so that the volume of the compartment can be enlarged or reduced. Finally, the compartment includes a cover flap 50 having a fastener, such as a buckle 51 for retaining the cover flap in place.

Extending from the upper portion of web 38 and midway between the longitudinal extremities of the web is a handle 52. Handle 52 is fastened to web 38 by means of suitable fasteners, such as screws, at either end of the handle, one such screw being seen in FIG. 3 at 53. The lower end of the screw secures to the underside of the web a U-shaped channel 54 for mechanically engaging elongate member 12 to retain carrier bag 32 in place. U-shaped channel 54 is constructed of a suitable plastic material which has sufficient resilience that it mechanically engages the elongate member but yields to afford removal from the elongate member. The U-shaped channel includes a central portion 56 through which screw 53 extends. Extending from opposite side edges of central portion 56 and perpendicular thereto are side flanges 58 and 60. As can be seen in FIG. 3, the inner surfaces of the side flanges confront one another to define a space therebetween which is approximately equal to the outer diameter of elongate member 12. The inner surface of each of the side flanges has an upper rib 62 and a lower rib 64 which are parallely spaced from one another by an amount less than the diameter of elongate member 12 so that engagement between the flanges of the U-shaped channel and the elongate member can be effected as seen in FIG. 3. More particularly, upper ribs 62 reside above the central axis of the elongate member and lower ribs 64 reside below the central axis of the elongate member. It will be noted that the inner surfaces of lower ribs 64 form downward converging surfaces 66 so as to facilitate deformation of the U-shaped channel when it is desired to engage carrier bag 32 with elongate member 12. It is preferable that U-shaped channel 54 be substantially coextensive with the length of web 38 so that mechanical engagement between the U-shaped channel and the elongate member exists throughout the entire length thereof.

In using an article carrying bag of the invention, elongate member 12 is first installed onto a bicycle. The connection between the lower ends of supports 18 and mounting clamps 22 is established so that the elongate member is approximately level. In addition, the vertical position of clamping members 30 is established so that guards 26 are similarly level and are spaced below elongate member 12 by a distance less than the vertical extent of carrying bag 32. Compartments 34 and 36 are loaded in a conventional manner by releasing buckles 51, opening flaps 50 and inserting within the compartments such articles as are to be carried. It is desirable but not necessary that the load be distributed evenly between the two compartments. After the flaps are closed and buckles 51 engaged one can grasp handle 52, move the carrier bag 32 into straddling relationship to the elongate member and simply press down. The diverging surfaces 66 on ribs 64 within U-shaped channel 54 facilitate slight elastic deformation of the U-shaped channel to move the U-shaped channel into the position shown in FIG. 3 at which elongate member 12 is mechanically engaged by the channel flanges. The presence and location of guard 26 retains the compartments away from contact with wheel rim W and spokes S.

When it is desired to remove carrier bag 32 from the bicycle, as might be necessary when a student arrives at a classroom building, handle 52 is grasped and pulled upward so as to disengage the flanges of U-shaped channel 54 from mechanical engagement with elongate member 12. Because the lateral extent of web 38 is small, the appearance of the carrier bag is substantially the same as existing briefcases and the like. That is to say, the slot defined between compartments 34 and 36 is not prominent because the lateral dimension thereof is relatively small.

Thus it will be seen that the present invention provides an article carrying bag for bicycles and like wheeled vehicles which is easy to install and remove, light in weight and has substantial capacity. Moreover, the carrying bag 32 can be used separate from elongate rod 12 and its mounting structure in the manner of a briefcase. Finally, the presence of stiffener 46 assures that the carrier bag 32 will reside in a symmetrical position as seen in FIGS. 1 and 3 notwithstanding asymmetrical loading of compartments 34 and 36.

Although one embodiment of the present invention has been shown and described, it will be obvious that other adaptations and modifications can be made without departing from the true spirit and scope of the invention.

What is claimed is:

1. An article carrier for a bicycle or like vehicle having a wheel and a frame supporting the wheel for rotation in a generally vertical plane comprising a rigid elongate member, mounting means for mounting said elongate member on said frame above said wheel within said plane, an article container having an elongate central web and means for defining first and second article compartments on opposite sides of said web, said compartment defining means depending from opposite sides of said web to afford disposition of said compartments in flanking relation to said elongate member and said wheel, and attaching means fastened to the underside of said web for removably attaching said web to said elongate member, said attaching means including first and second flanges depending from the underside of said web in spaced apart relation, said flanges having respective inner surfaces that confront one another to define a slot having a width corresponding to the outer dimension of said elongate member, said flanges having converging edge surfaces remote from said web and being elastically deformable so as to resiliently engage said elongate member and being yieldable to afford selective disengagement from said elongate member.

2. An article carrier according to claim 1 including a handle and means for securing said handle to the upper side of said web substantially midway between the longitudinal extremities of said web.

3. An article carrier according to claim 1 wherein said elongate member mounting means includes first and second rigid elongate guards and means for fixing said guards in substantial parallelism with said elongate member, said fixing means fixing said guards below said member and on opposite sides of said wheel without said plane, said guards serving to retain the portions of said compartment defining means remote from said web outward of said wheel.

4. An article carrier according to claim 1 in combination with a semi-rigid stiffener having a central portion substantially coextensive with said web and fixed thereto, said stiffener having first and second planar portions integral with and extending perpendicularly from opposite sides of said central portion, said planar portions being substantially coextensive with respective said compartments, and means for joining said compartment defining means to respective said planar portions.

5. An article carrier according to claim 4 wherein said compartment defining means is formed of flexible fabric material and wherein said joining means includes first and second fabric sheets on opposite sides of respective said planar portions for capturing said stiffener.

6. An article carrier according to claim 1 wherein said rigid elongate member has a substantially cylindric exterior surface and wherein said attaching means includes engaging means for mechanically engaging said elongate member at diametrically opposite portions of said cylindric surface, said engaging means including upper and lower parallel ribs on the respective inner surfaces of said flanges, said upper and lower ribs being spaced from one another so that said upper rib resides above said elongate member and said lower rib resides below said elongate member when said attaching means is engaged with said elongate member.

7. An article carrier according to claim 6 wherein said engaging means is continuous and is substantially coextensive with said web to effect mechanical engagement with said rigid elongate member throughout the length of said web.

8. An article carrier according to claim 6 wherein said engaging means comprises a resilient U-shaped channel having a central portion and two side plate portions extending from opposite edges of said central portion in perpendicular relation thereto, said plate portions having inner surfaces that confront one another to define a space therebetween substantially equal to the diameter of said cylindric surface, said inner surfaces each having an upper inwardly extending rib and a lower inwardly extending rib, said ribs being spaced from one another by an amount less than the diameter of said cylindric surface.

9. An article carrier for a bicycle or like vehicle having a wheel and a frame supporting the wheel for rotation in a generally vertical plane comprising a rigid elongate member, mounting means for mounting said elongate member on said frame above said wheel within said plane, an article container having an elongate central web and means for defining first and second article compartments on opposite sides of said web, said compartment defining means depending from opposite sides of said web to afford disposition of said compartments in flanking relation to said elongate member and said wheel, attaching means fastened to the underside of said web for removably attaching said web to said elongate member, a semi-rigid stiffener having a central portion substantially coextensive with said web and fixed thereto, said stiffener having first and second planar portions integral with and extending perpendicularly from opposite sides of said central portion, said planar portions being substantially coextensive with respective said compartments, and means for joining said compartment defining means to respective said planar portions.

* * * * *